United States Patent [19]

Miyake

[11] 4,015,119

[45] Mar. 29, 1977

[54] UNDER EXPOSURE AND FADE INDICATOR

[75] Inventor: Teruhiko Miyake, Tokorozawa, Japan

[73] Assignee: Nihon Beru-Haueru Kabushiki Kaisha, Higashimurayama, Japan

[22] Filed: Dec. 24, 1975

[21] Appl. No.: 644,780

[30] Foreign Application Priority Data

Dec. 25, 1974 Japan .............................. 50-2681

[52] U.S. Cl. ...................... 250/214 D; 354/60 L; 352/91 C
[51] Int. Cl.² ................... H01J 39/12; G03B 21/36
[58] Field of Search .............. 352/141, 91 S, 91 C; 354/40, 42, 43, 47, 60 R, 60 L; 250/214 P

[56] References Cited

UNITED STATES PATENTS

| | | | |
|---|---|---|---|
| 2,518,717 | 8/1950 | Rath | 352/141 |
| 3,495,515 | 2/1970 | Reimann | 250/214 P |
| 3,594,088 | 7/1971 | Akiyama et al. | 250/214 P |
| 3,623,989 | 11/1971 | Mayr et al. | 352/141 |
| 3,664,244 | 5/1972 | Painton | 352/141 |

*Primary Examiner*—Alfred E. Smith
*Assistant Examiner*—David K. Moore
*Attorney, Agent, or Firm*—John E. Peele, Jr.; Roger M. Fitz-Gerald; Gerald B. Epstein

[57] ABSTRACT

To inform the operator of a motion picture camera of under-exposure and the status of a fade operation, an indicator circuit is provided. The indicator circuit is in circuit with an automatic exposure control system which adjusts the diaphragm for correct film exposure under varying light conditions and an electronically controlled fade system which adjusts the diaphragm for a fade-in and fade-out sequence independently of the varying light condition on the subject.

3 Claims, 1 Drawing Figure

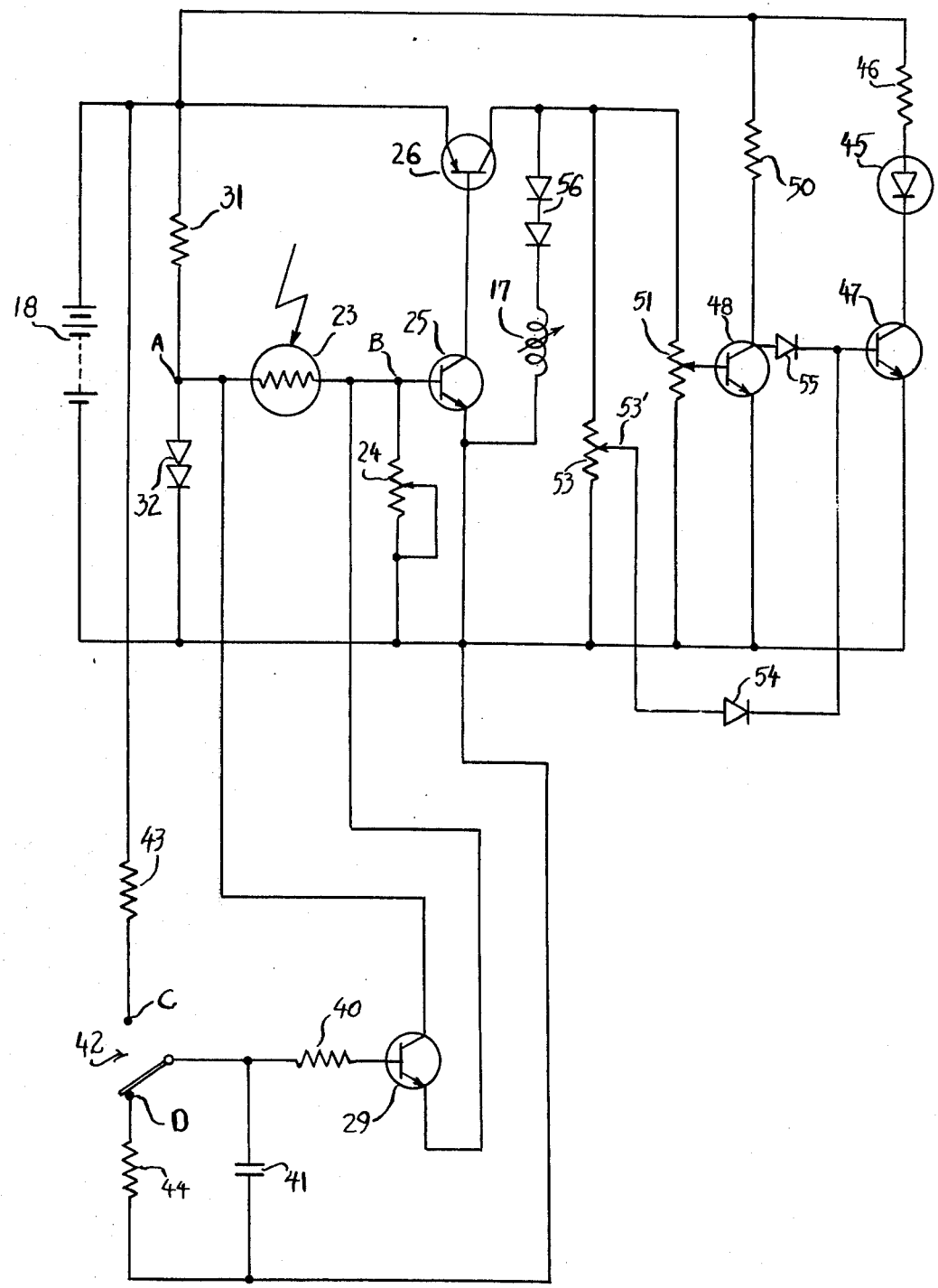

UNDER EXPOSURE AND FADE INDICATOR

This invention relates to an improvement in a motion picture camera and particularly to an indicator for informing the operator of the camera of under-exposure, and of the fade condition during a fade-in and fade-out sequence.

Many motion picture cameras have automatic exposure control systems for automatically varying the opening of the diaphragm to maintain correct exposure of the film in the camera according to the brightness of the scene being photographed. Often, the status of exposure within or without the exposure range is not made known to the camera operator. Thus, should under-exposure occur due to inadequate light being available for photographing a particular scene, it is desirable that the operator be informed that either no image will be recorded or at least the image will be incorrectly exposed.

When a fade system is incorporated in the camera, another potential source of incorrect exposure is introduced. If the fade system has been actuated to a fade-out condition with the diaphragm stopped down to a nearly closed or completely closed condition, the camera operator may photograph a scene inadvertently, not being aware the film will not be exposed at all or, at best, will be underexposed. Since film being transported through the camera under such conditions is effectively wasted, an indication of the exposure condition as altered by the fade system should be made available to the operator.

Broadly, the invention relates to an indicator in a circuit for informing a camera user of insufficient light for correct film exposure, and of the status of a fade system when in a condition which likely will cause incorrect film exposure. In the circuit, the meter, by which the diaphragm is adjusted, is controlled through solid state components. Also, in the circuit is an illuminable component which is energized to selected levels at selected instances to alert the camera operator to the extent of the adverse condition.

More specifically, circuitry for an automatic exposure control system of a camera including a fade system is improved by incorporation in the circuit of an indicator. The exposure control portion of the circuit maintains correct film exposure by changing the diaphragm opening in accordance with variations in brightness of a scene. The fade system portion of the circuit enables fade-out and fade-in modes of diaphragm, regardless of the brightness of the scene being photographed. The fade-out mode occurs by gradually closing the diaphragm opening from the correct exposure opening, and the fade-in mode by gradually opening the diaphragm to the correct exposure opening. Under-exposure and the fade out condition are indicated by lighting of an indicator lamp through circuitry when correct exposure would not occur due to insufficient light on a photocell even if the diaphragm is adjusted by the meter to a fully open condition. Further, the indicator lamp may be gradually energized or de-energized responsive to the fade mode.

Thus, an object of the invention is to provide a novel indicator circuit for informing a camera operator of low conditions of light impinging on film in the camera so as to cause incorrect film exposure.

Objects and advantages of the invention will become apparent from the detailed description which follows when taken in conjunction with the accompanying drawing in which:

The FIGURE is a diagram illustrating schematically circuitry of a camera incorporating an indicator system in accordance with this invention.

To control exposure of film during normal filming sequences, a meter 17, energized selectively by a power source 18, such as a battery, is controlled to move the diaphragm (not shown) of the camera. The diaphragm in the form of an iris or blades is adjusted in response to voltage through connections to a photocell 23, such as a photoresistor light sensing member, a variable resistor 24, and transistors 25 and 26. The meter 17 is connected between the collector of the transistor 26, and ground. The circuit connects one end of the photocell 23 at junction A so that the voltage from the battery 18 is constantly regulated by resistor 31 and diode 32. The other end of the photocell is connected to the base of the transistor 25 through one end of the variable resistor 24. The collector of transistor 25 is connected to the base of the transistor 26, which is connected by its emitter to the positive battery terminal, to which one end of the resistor 31 is connected, also. The transistor 26 is connected to the positive terminal of battery 18. The other end of the variable resistor 24 is connected to the minus side of the battery 18, together with the other end of the diode 32 and the emitter of transistor 25. The voltage at circuit connection B is essentially fixed by the resistance ratio of the photocell 23 and the variable resistor 24 as the meter tends to adjust light impinging on the photocell so that the resistance remains balanced relative to the variable resistance. The opening of the diaphragm changes as the meter 17 moves in response to the variations in scene light which illuminates photocell 23 with a quantity of light corresponding to the quantity of light necessary to properly expose the film in the camera.

Another transistor 29 is connected by its emitter at junction B to the photocell 23 and by the collector thereof at junction A. To the base of transistor 29 is connected a resistor 40, the common contact D of a double throw switch 42, and one end of a condensor 41. Contact C of the double throw switch is connected to the plus or positive terminal of the battery 18 through a resistor 43. The contact D of switch 42 is connected to the negative side of the battery 18 through a resistor 44 and the other end of condensor 41.

An indicator lamp 45, such as a light emitting diode, is connected on one end thereof to the plus side of the battery 18 across a resistor 46. The other end of the lamp is connected to the collector of a transistor 47. The indicator lamp, which might be arranged in or adjacent to the viewfinder of the camera, indicates the status of the fade system and warns of under exposure. The base of the transistor 47 is connected to the collector of a transistor 48. This latter transistor 48 is connected by its emitter to the negative pole of the battery. A second variable resistor 51 is connected to a third variable resistor 53 which is positioned between the collector of the transistor 26 and the negative side of the battery 18. The other end of the variable contact 53' shown by the arrow — is connected to the base of the transistor 47. A set of diodes, such as the pair shown at 54, 55 is provided to prevent reverse polarity current from affecting the transistor 47. A voltage regulator diode package 56 is arranged in the circuit to control the voltage from the power supply battery 18 to the meter 17.

In the preferred embodiment contructed as shown in the drawing, the double throw switch 42 is positioned at D for normal exposure regulation. In this condition of the circuit, the electric potential or voltage at the base of transistor 29 is zero. Therefore, the internal resistance between the collector and the emitter is large and the transistor is "off" so that no electric current flows through the base of that transistor. Thus, the voltage divided by the photocell 23 and the variable resistor 24 is added together and applied to the base of the transistor 25. The resulting voltage drives the meter 17 which is therefore kept constant by the actuation of transistor 26 in combination with changes in voltage applied to the base of transistor 25 as light impinging on photocell 23 varies.

When the quantity of light which illuminates photocell 23 is increased by more light being reflected from the field of view, that voltage available to the base of the transistor 25 is increased. This voltage increase occurs due to a reduction in the resistance of the photocell 23 causing a change in the voltage divided by the resistance and the resistor 24. The voltage change causes the meter 17 to move so as to close the diaphragm to decrease the quantity of light impinging on the photocell 23 until the voltage through the variable resistor 24 is again balanced. The change of the meter is caused by the temporary decrease in the resistance of the photocell 23 which increases the current between the emitter and the collector of transistor 26, and causes the voltage which drives the meter 17 to be higher temporarily.

As the light through the diaphragm is reduced to the level for correct film exposure, the resistance of the photocell is lowered until the voltage which drives the meter 17 is again balanced, thereby stopping the meter 17. If the resistor 50, which is connected to the collector of the transistor 26, is adjusted to keep conduction between the collector and the emitter in transistor 48, the voltage at the collector of that transistor becomes almost the same as ground. Thus, the electrical potential applied to the base of the transistor remains zero. Therefore, the camera operator knows the picture is being given the correct exposure as the transistor 47 is not conductive between the collector and the emitter thereby preventing illumination of the indicator lamp 45.

Alternatively, if the subject is not bright and the light to the photocell 23 is decreased beyond the range of adjustment of the diaphragm, the transistor 25 becomes inoperative as the resistance of the photocell becomes very large. The voltage divided by the photocell and the resistance 24, which is applied to the base of the transistor 25, becomes small. If the current between the emitter and collector of transistor 26 is restricted, the voltage at the collector of transistor 26 becomes lower than it would be for correct film exposure. Thus, the voltage at the base of the transistor 48 which is connected to the resistor 51 becomes lower wherein the transistor 48 is not conductive across the collector and emitter. Therefore, the indicator lamp 45 is energized to warn the camera operator of underexposure. Energization of the lamp 45 is enabled as the voltage at the collector of transistor 48 becomes high enough to turn "on" transistor 47 and permit current to flow through the indicator lamp 45.

To accomplish a fade-out sequence with a camera incorporating the embodiment being described, the switch 42 is changed from contact D to contact C. The change over of the switch causes the transistor 25 to become conductive as the ratio of resistance between the photocell 23 and the variable resistance 24 changes. As the transistor 26 becomes conductive, the voltage which drives the meter 7 becomes higher so that the exposure control system, which is otherwise maintained balanced for correct film exposure, becomes unbalanced. This unbalancing, regardless of brightness of the subject in the scene being photographed, occurs as the meter 17 is moved so as to close gradually the diaphragm causing the exposure to be reduced resulting in the recorded image appearing to fade-out.

As the reduction in exposure occurs, the indicator lamp 45 is generally energized. The variable resistor 53 is positioned between the collector of transistor 26 and ground. The voltage across the transistor 26 become high as the transistor 29 becomes conductive as a result of the charge building on capacitor 41. When the voltage divided by the resistor 53 is fed to the base of transistor 47 through diode 54, the latter transistor becomes conductive. Thus, the indicator lamp 45 is lit gradually, essentially in proportion to the opening of the diaphragm, which opening is reduced by the movement of the meter 17. As the fade-out operation is completed by the diaphragm being further closed, the indicator lamp is fully energized until the camera start switch (not shown), which controls circuit energization and camera operation, is opened to stop the camera.

A fade-in operation is accomplished either following the fade-out operation or at least an operation wherein the diaphragm as been closed beforehand. That is, if a fade-out operation has not preceded immediately, the diaphragm may not be substantially closed as necessary to generate an effective fade-in operation wherein the film exhibits little or no exposure and increases to correct exposure. Thus, the exposure control system is actuated in the fade-out mode but without operation of the film transport mechanism. Since the exposure at the start of a fade-in operation is inadequate, the indicator lamp is energized to a fully lit condition.

The fade-in operation, by which the meter 17 gradually opens the diaphragm from a fully or substantially closed diaphragm condition to the correct exposure condition, is initiated by changing the switch 42 from contact D to contact C. Upon change of the switch, the transistor 29 is changed from conductive character to non-conductive character. The voltage of variable resistor 51 becomes lower as the voltage to meter 17 gradually becomes constant. Similarly, the voltage at the base of the transistor 47 approaches the voltage which makes the transistor less-conductive across the collector and emitter, and eventually non-conductive. Therefore, the indicator lamp 45 is reduced gradually from the full energized condition to a non-energized "off" condition. When the lamp reaches of "off" condition, the camera operator is informed that the fade-in is complete and adequate light is impinging on the photocell 23 for correct or normal film exposure.

Although as described with respect to this preferred embodiment, the lighting status of the indicator lamp 45 is gradually changed as fade-in and fade-out operations occur, other conditions of the lamp can be established. For example, the circuit can be altered as by adjusting the variable resistor 53 so that the lamp is lit only when the diaphragm is completely closed during fade operations. Also, other devices causing modifications of the diaphragm can be incorporated wherein the resistor manually or otherwise is adjusted to cause changing of the brightness of the lamp as the light on the photocell is modified.

Further, in the preferred embodiment, the transistor 47 can be used to reverse the electric potential which drives the meter so as to light the indicator lamp when under exposure should occur even if the meter is moved so as to open the diaphragm in order to permit more light to impinge on the film. Also, an in and output reversing device can be used, other than in the preferred embodiment, such that the lamp can be directly turned on and off without the transistor 47.

In summary, an economically advantageous indicator, requiring little space, is provided in the camera to inform the camera operator of two important camera operation conditions; as an under-exposure indicator that the picture to be taken will be improperly exposed; and as a fade indicator that the fade operation has been performed, and the extent to which a fade-out and fade-in cycle has been completed.

What is claimed is:

1. For a camera having an exposure control system driving a diaphragm and having a fade system, an indicator system for informing the camera operator of the status of the exposure control system and the status of the fade system, the exposure control system varying the opening of the diaphragm for correct film exposure in accordance with the brightness of a scene being photographed, and fade control circuitry gradually closing the diaphragm opening from the correct exposure opening during a fade-out sequence, and gradually opening the diaphragm opening from a substantially closed condition to the diaphragm opening for the correct exposure opening during a fade-in sequence, the indicator system being connected in combination with a camera control circuit comprising:

the camera control system including:
a power supply;
the exposure control system including:
a photocell in circuit with said power supply, having a resistance variable in response to the quantity of light inpinging thereon;
a meter in circuit with said photocell;
first circuit means connecting said photocell to said meter and said power supply for driving said meter in response to light impinging on said photocell to maintain constant said light impinging on said photocell; said circuit means including transistor means in circuit with said photocell to be made conductive when the resistance of said photocell varies from a predetermined value;
an indicator lamp;
second circuit means connecting said photocell and said power supply to said indicator lamp for energizing said lamp when an inadequate quantity of light impinges on said photocell causing said transistor means to become conductive;
third circuit means including fade means connecting said photocell, said meter, and said indicator lamp for altering the status of said meter independent of light impinging on said photocell wherein said indicator lamp is energized during selected conditions of said fade means; and
fourth means for selectively connecting said third circuit means with said first and second circuit means for causing initiation of a fade sequence.

2. The indicator system as in claim 1 wherein said second circuit means includes:
second transistor means connected in circuit with said photocell and said base of said first transistor means to cause said first transistor means to become conductive when said second transistor means is conductive responsive to insufficient light on said photocell; and
third transistor means energizable in response to said second transistor means for causing said second transistor means and third transistor means to become conductive to energize said lamp regardless of the quantity of light impinging on said photocell.

3. The indicator system as in claim 1 wherein said third circuit means includes:
a condensor means and,
a transistor means in circuit with said condensor means for becoming gradually energized and deenergized to vary the meter independent of light impinging on said photocell.

* * * * *